May 24, 1927.

J. DUMONT 1,630,173

DOUBLE CARVING CUTTER

Filed Nov. 6, 1926

Inventor
Joseph Dumont
By Attorneys
Southgate Fay & Harley.

Patented May 24, 1927.

1,630,173

UNITED STATES PATENT OFFICE.

JOSEPH DUMONT, OF GARDNER, MASSACHUSETTS.

DOUBLE CARVING CUTTER.

Application filed November 6, 1926. Serial No. 146,787.

This invention relates to a wood working cutter for use on carving machines molders, rope leg machines, and other wood working machines in which two opposite corners are rounded off or otherwise molded.

The principal objects of the invention are to provide a double cutter of a yielding character to permit the two cutting surfaces to separate and come together automatically, and to provide means for guiding the cutter along the surface of the wood to be operated upon so that the cutter may be operated without any other guiding means; and to provide improvements in construction as will appear.

Reference is to be had to the accompanying drawings in which

Figure 1:
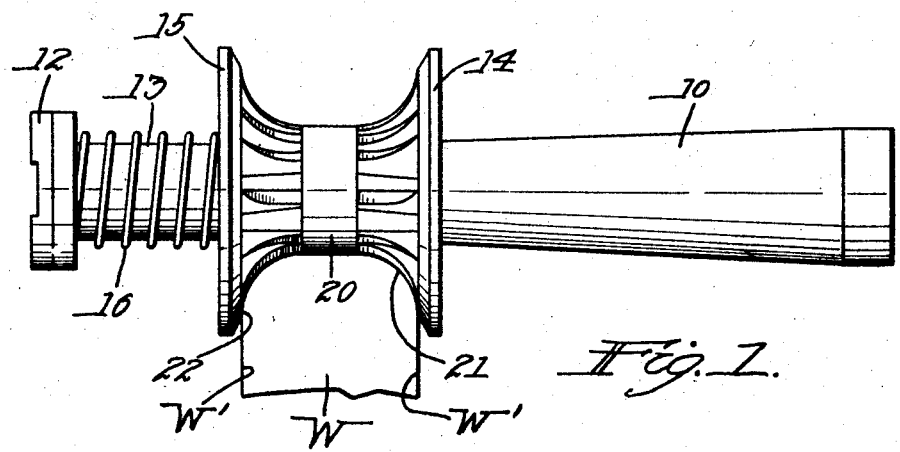
Fig. 1 is a side view of a cutter constructed in accordance with this invention shown in operation on a piece of work.
Figure 2:
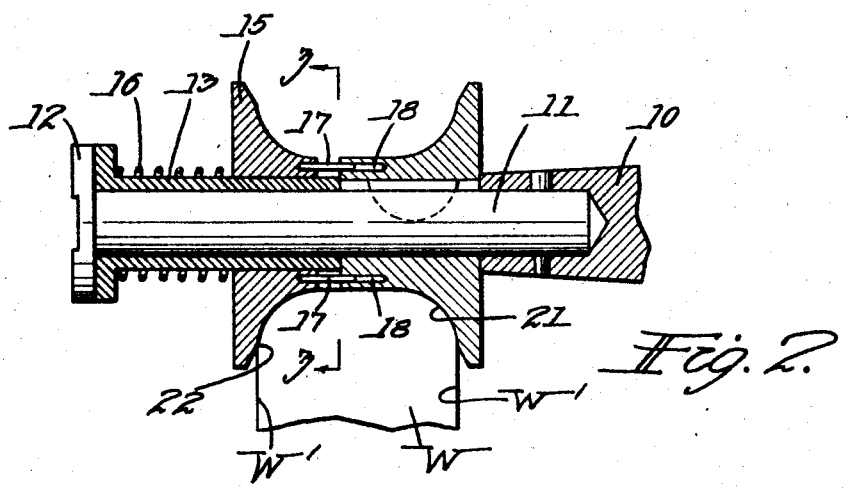
Fig. 2 is a central longitudinal sectional view of the same showing the cutters spread apart to operate on a wide piece of work.
Figure 3:
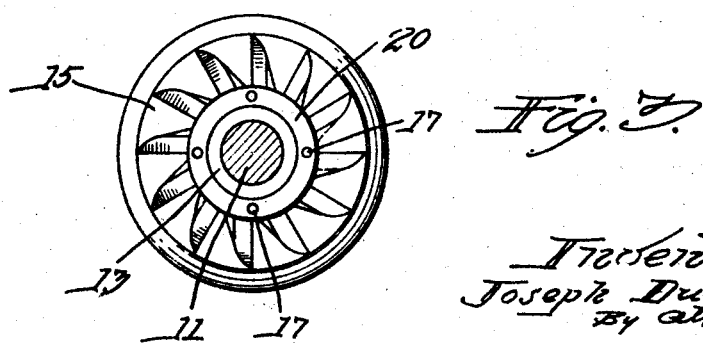
Fig. 3 is a sectional view on the line 3—3 of Fig. 2.

This cutter is intended to be mounted on a shaft or spindle 10 of a molder, carving machine, or the like. To this spindle is pinned a stud 11 which is provided with a head 12 resting against the head of a tubular member 13 on the stud 11. Keyed on the stud 11 is a circular molding cutter 14 and free on the tube 13 is a similar cutter 15 preferably having the same cutting outline but of the opposite hand. It will be be understood that these two cutters can be of different shapes within the scope of this invention.

On the tube 13 is a spring 16 which bears under the head of the tube and on the side of the cutter 15 to force it toward the opposite cutter 14. This cutter 15 is provided with a series of pins 17 fixed therein and arranged parallel to the axis of the whole device. These enter recesses 18 in the cutter 14 and transmit the rotation from one to the other so that they are positively connected.

A feature of material importance is a cylindrical member 20, which may be separate from the cutters if desired, but is shown as integral with the cutter 14. This constitutes a cylindrical guiding surface for engaging the surface of the article W to be operated on and permitting the operator to perform the cutting action in a full and unrestricted manner as will be pointed out later and keep the cuts always the same depth. This cylindrical member or band 20 constitutes a guiding means for controlling the operation of the cutter. It will be seen that the cutting surfaces 21 terminate short of a pair of relatively flat surfaces 22 on the cutters, which surfaces bear against the parallel opposite surfaces $w'$ of the piece of work to insure the proper distance apart of the cutters.

In using the device, the parts are set up as shown and described and a piece of wood W, which may be chair arm or leg or any other piece of wood, is guided wholly, or in part, by the hands of the operator to move along the double cutter which is mounted to turn on a stationary axis. This piece of wood may be moved forward and back in various ways duirng the progress of the cutting or molding operation but it is kept always in contact with the surface 20. The width of the work may vary from end to end but that is all taken up by the spring 16. The cutter 15 moves back and forth in accordance with the width of the work and the operator does not have to pay any especial attention to such variations.

The wood obviously is rounded off, at its opposite edges equally in the form shown in the drawings. It will be seen that the pins 17 positively hold the free cutter 15 and force it to rotate with the other cutter with no possible difference in the rate of rotation or the cutting action. The spring 16 always forces this cutter up against the surface of the wood. Therefore a piece of work of varying width and contour will be molded on both edges equally without adjustments by the operator.

Although I have illustrated and described only a single form of the invention I am aware of the fact that modifications can be made therein by any person skilled in the art without departing from the scope of the invention as expressed in the claims. Therefore, I do not wish to be limited to all the details of construction herein shown and described, but what I do claim is:—

1. As an article of manufacture, a double cutter comprising a pair of rotary cutting members for molding the opposite edges of a piece of wood or the like, one of said cutters being fixed on its shaft to rotate therewith and the other being free, said cutters being connected with each other so as to cause both to rotate positively with the shaft but to permit one to slide thereon, yielding means for forcing the free cutter toward the fixed cutter, and a cylindrical guiding surface between the cutters for engaging substantially the center of a surface of the work between the edges that are to be molded.

2. As an article of manufacture, a double cutter comprising a pair of rotary cutting members each having blades thereon for molding the opposite edges of a piece of wood or the like, one of said cutters being fixed on its shaft to rotate therewith and the other being free, the fixed cutter being connected with the free cutter so as to rotate positively with the shaft but to permit one of them to slide thereon, yielding means for forcing the free cutter toward the fixed cutter, one of said cutters being provided with a cylindrical guiding surface for engaging substantially the center of a surface of the work between the edges that are to be molded.

3. As an article of manufacture, a double cutter for molding the opposite edges of a piece of wood or the like, one of the cutters being fixed on its shaft to rotate therewith and the other being free, means connecting the cutters so as to cause the free cutter to rotate positively with the shaft but to permit it to slide thereon, yielding means for forcing the free cutter toward the fixed cutter, and a cylindrical guiding surface for engaging substantially the center of a surface of the work between the edges that are to be molded and each cutter having a substantially transverse surface at the edge for engaging the opposite parallel surfaces of the work.

4. In a double cutter for wood working machines, the combination with a shaft, of two cutters mounted thereon, one being fixed to the shaft and the other free to slide but restricted to rotate positively with the shaft, yielding means for forcing the two cutters together, and a central circular guide for engaging the surface of the work to be molded and controlling the depth of cut of both cutters.

5. In a double cutter for wood working machines, the combination with a shaft, of two cutters mounted thereon, one being free to slide but restricted to rotate positively with the shaft, yielding means for forcing the two cutters together, a central circular guide between the cutters for engaging the surface of the work to be molded and controlling the depth of cut of both cutters, both cutters having transverse surfaces for engaging the sides of the work and holding them apart a distance controlled by the width of the work.

In testimony whereof I have hereunto affixed my signature.

JOSEPH DUMONT.